United States Patent
Stickel

(10) Patent No.: US 6,351,945 B1
(45) Date of Patent: Mar. 5, 2002

(54) HYDROSTATIC GEAR UNIT

(75) Inventor: Oskar Stickel, Langenau (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 0 days.

(21) Appl. No.: 09/701,594

(22) PCT Filed: Oct. 20, 1999

(86) PCT No.: PCT/EP99/07971

§ 371 Date: Nov. 30, 2000

§ 102(e) Date: Nov. 30, 2000

(87) PCT Pub. No.: WO00/26563

PCT Pub. Date: May 11, 2000

(30) Foreign Application Priority Data

Oct. 30, 1998 (DE) .......................... 198 50 162

(51) Int. Cl.⁷ .............................. F16H 61/46
(52) U.S. Cl. .......................... 60/445; 60/489
(58) Field of Search ................... 60/445, 447, 489

(56) References Cited

U.S. PATENT DOCUMENTS

| | | | |
|---|---|---|---|
| 4,216,656 A | * 8/1980 | Hamma | 60/445 |
| 4,481,770 A | * 11/1984 | Lohbauer et al. | 60/445 X |
| 4,712,377 A | * 12/1987 | Yoshida et al. | 60/445 X |
| 5,177,964 A | * 1/1993 | Tanaka et al. | 60/445 |
| 5,907,951 A | * 6/1999 | Toyooka et al. | 60/445 |
| 5,907,952 A | * 6/1999 | Akasaka et al. | 60/445 X |
| H1977 H | * 8/2001 | Poorman | 60/445 |

FOREIGN PATENT DOCUMENTS

| | | |
|---|---|---|
| DE | 2 305 086 | 8/1973 |
| EP | 0 279 152 A1 | 8/1988 |
| EP | 0 484 526 A1 | 5/1992 |
| JP | 58-142063 | 8/1983 |
| JP | 6-280811 | 10/1994 |
| WO | WO 94/09293 | 4/1994 |

* cited by examiner

Primary Examiner—John Ryznic
(74) Attorney, Agent, or Firm—Scully, Scott, Murphy & Presser

(57) ABSTRACT

The inventive hydrostatic gear unit (1) comprises a hydraulic pump (2) and an adjustable hydraulic motor (6) which is connected to the hydraulic pump (2) via operating lines (4, 5). A drive control valve (3) is arranged in the operating lines (4, 5) for adjusting the delivery volume of the hydraulic medium flowing from the hydraulic pump (2) to the hydraulic motor (6). An adjusting device (7) is used to adjust the displacement volume of the hydraulic motor (6). The adjusting pressure of the adjusting device (7) is controlled via a control valve (24). A pilot control (12) is also provided which produces a control pressure in accordance with a transmitter (11). Said control pressure acts on the drive control valve (3) for adjusting the delivery volume flowing from the hydraulic pump (2) to the hydraulic motor (6). Said control pressure also acts on the control valve (24) for adjusting the displacement volume of the hydraulic motor (6). The control valve (24) is controlled by the difference in pressure between the operating pressure in the operating lines (4, 5) at the hydraulic motor (6) and the control pressure produced by the pilot control (12).

11 Claims, 3 Drawing Sheets

HYDROSTATIC GEAR UNIT

The invention relates to a hydrostatic transmission, in particular for driving vehicles.

A hydrostatic transmission according to the preamble of claim 1 is already known from WO 94/09293. In this case a hydraulic pump is connected to an adjustable hydraulic motor via a direction-of-travel valve and a brake valve. The displacement volume of the hydraulic motor can be adjusted by an adjusting device, which is actuated by a regulating valve. A shuttle valve is disposed between the direction-of-travel valve and the brake valve and supplies the working pressure produced by the hydraulic pump to the regulating valve via a control line. The displacement volume of the hydraulic motor is therefore adjusted in accordance with the working pressure produced by the hydraulic pump.

In order to prevent the hydraulic motor from being operated at an excessively high speed, a speed sensor is disposed at the driven shaft of the hydraulic motor, which sensor supplies a microcontroller with an appropriate electrical control signal. The microcontroller converts this to an electrical initiator signal, which is supplied to an electromagnetic initiator disposed at the regulating valve. If the speed at the driven shaft of the rotor exceeds a predetermined threshold value, the microcontroller acts via the regulating valve on the adjusting device so as to reduce the speed of the hydraulic motor.

As a change-under-load transmission with two change-speed gears is subordinate to the hydraulic motor, the control characteristic described above is overridden in accordance with the gear which is engaged at the change-under-load transmission.

However this known hydrostatic transmission entails the disadvantage of relatively sluggish actuation of the hydraulic motor, as the control pressure acting on the regulating valve is derived from the working lines. A further disadvantage lies in the fact that the protection which is provided to limit the speed of the hydraulic motor is relatively complex, as it requires an electronic speed sensor, an electronic microcontroller and an electromagnetic initiator. Expenditure is increased as a result of these electronic components.

The object of the invention is therefore to provide a hydrostatic transmission which enables the displacement volume of the hydraulic motor to be rapidly adapted with low inertia to the desired travelling speed and at the same time guarantees effective protection against an excessive hydraulic motor speed.

The invention is achieved by the characterising features of claim 1 in conjunction with the features constituting the type in question.

The invention is based on the recognition that a control pressure produced by a pilot control device can be used to actuate both the driving control valve and the regulating valve. In this respect the control pressure produced by the pilot control device directly defines the delivery and the delivery direction of the hydraulic medium from the hydraulic pump to the hydraulic motor and, on the other hand, simultaneously determines the displacement volume of the hydraulic motor. This dual function of the control pressure produced by the pilot control device increases integration and simplifies the structure of the hydrostatic transmission. The regulating valve which regulates the adjusting pressure for the adjusting device is simultaneously directly actuated by the control pressure instead of indirectly via the working pressure in the working lines. By acting manually on the initiator of the pilot control device, the operator can therefore directly influence, the absorption volume of the hydraulic motor.

A further recognition according to the invention lies in the fact that the pressure difference between the control pressure and the working pressure prevailing in the working lines can be used to actuate the regulating valve. Protection against an excessive hydraulic motor speed can be provided by the direct action of the working pressure at the hydraulic motor on the regulating valve. If an excessive pressure in the delivering working line threatens to overload the hydraulic motor, this excessive working pressure causes, via the regulating valve and the adjusting device, the hydraulic motor to change over to a greater absorption volume and thus a reduced speed.

Claims 2 to 11 comprise advantageous developments of the invention.

According to claim 2, a separate control line is in each case connected to the pilot control device for each device, and the control valve is actuated by the pressure difference between the two control lines. According to claim 3, the respective higher control pressure can be tapped from the two control lines via a shuttle valve or two appropriately disposed non-return valves in order to actuate the regulating valve. According to claim 4, a shuttle valve, which is connected to the working lines, or two appropriately disposed non-return valves may be provided in corresponding fashion to actuate the regulating valve with the respective higher working pressure. It is alternatively possible, according to claim 5, to use a change-over valve instead.

According to claim 6, the regulating valve is advantageously a 3/2-way valve, which is connected on the inlet side to the working lines and the hydraulic medium tank and on the outlet side to an adjusting chamber of the adjusting, device. According to claim 7, the working pressure is admitted to a second adjusting chamber.

According to claim 8, a brake valve is advantageously provided which is actuated by the pressure difference in two first working line sections connected to the driving control valve. The brake valve enables a deceleration torque to be transmitted to the hydraulic motor by the back pressure resulting in the working lines in overrun, for example when driving downhill. According to claim 9, the brake valve is connected on the outlet side to each of the two working lines via non-return valves. The brake valve may therefore be of a relatively simple configuration and used for both directions of travel in the same way. According to claim 10, the brake valve is preferably a 3/2-way valve.

According to claim 11, an adjusting valve, for example an inching valve, may be disposed between a pressure source and the pilot control device so that a creep speed or emergency stop operation is possible.

The invention is described in detail in the following on the basis of embodiments and with reference to the drawings, in which.

Figure 1:
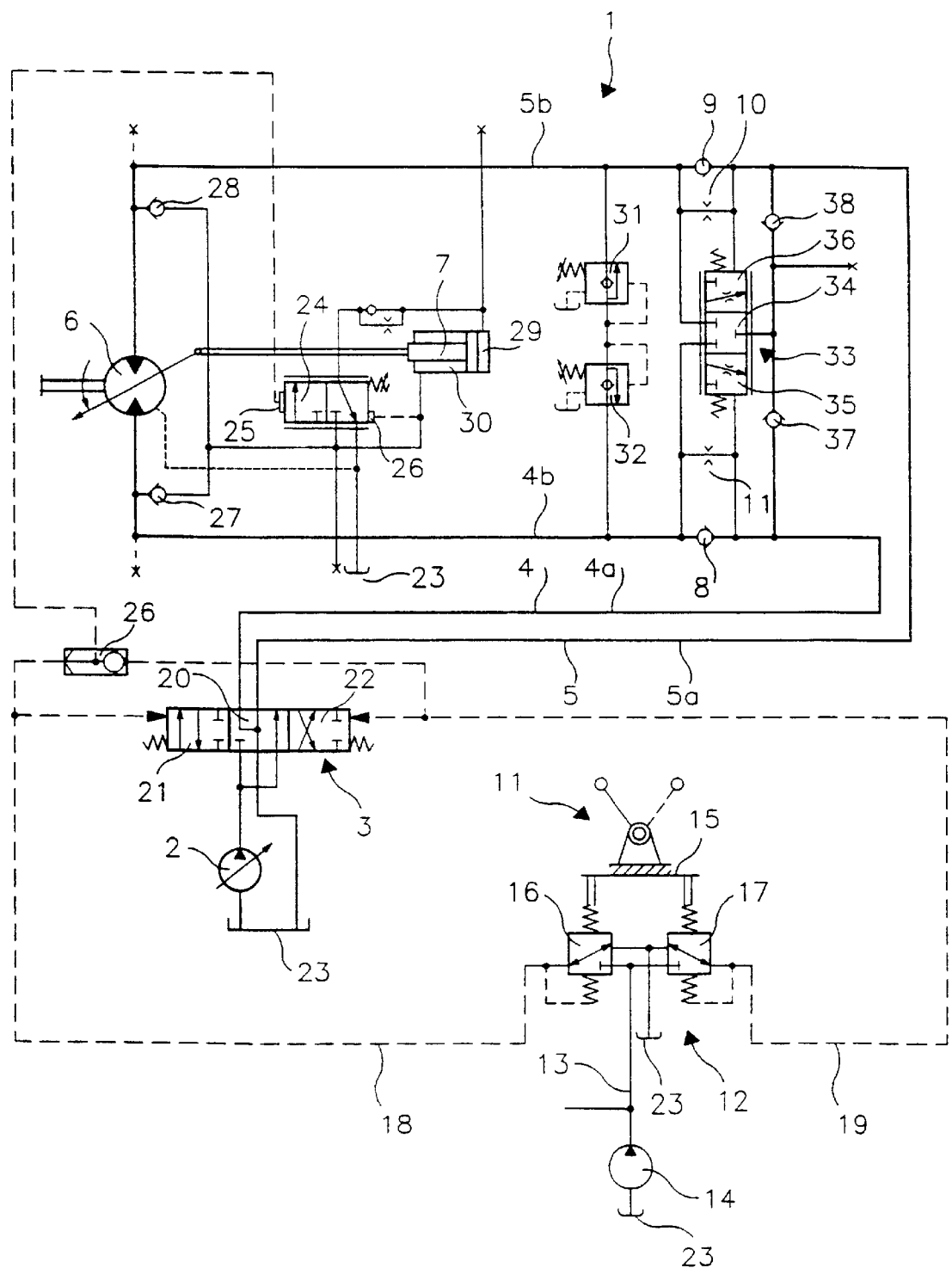
FIG. 1 is a first embodiment of a hydrostatic transmission according to the invention.

FIG. 1 is a basic hydraulic circuit diagram of a first embodiment of a hydrostatic transmission 1 according to the invention. The hydrostatic transmission 1, serves, for example, as a hydrostatic travelling drive for driving a vehicle. However it may also serve to drive a turning mechanism, for example an excavator, or other drive purposes.

The hydrostatic transmission 1 comprises a hydraulic pump 2 which in the embodiment is adjustable and which delivers into a first working line 4 or a second working line 5, according to the desired direction of travel, via a driving control valve 3.

The two working lines 4 and 5 are connected together via a hydraulic motor 6, the displacement volume of which can be adjusted by means of an adjusting device 7. The working lines 4 and 5 are divided into first working line sections 4a and 5a, which are connected to the driving control valve 3, and into second working line sections 4b and 5b, which are connected to the hydraulic motor 6. The first working line sections 4a and 5a are separated from the second working line sections 4b and 5b by a first non-return valve 8 and a second non-return valve 9, which are bridged by throttles 10 and 11.

The direction of travel and the travelling speed are predetermined by an initiator, for example a hand initiator or a pedal, of a pilot control device 12. The pilot control device 12 is connected via a connecting line 13 to a pressure source 14, for example an auxiliary pump. The initiator 11 acts via a lever mechanism 15 on a first pilot valve 16 and a second pilot valve 17. When the initiator 11 is operated in the direction of travel represented in FIG. 1, the first pilot valve 16 is opened and control pressure admitted to a first control line 18 in accordance with the swing-out of the initiator 11. Control pressure is on the other hand admitted to a second control line 19 via the second pilot valve 17 when the initiator 11 is operated in the position drawn in broken lines in FIG. 1 in accordance with a second direction of travel.

The pressure difference between the control pressures prevailing in the control lines 18 and 19 determines the position of the driving control valve 3, which is formed as a 5/3-way valve. When the driving control valve 3 is in the neutral position 20 represented in FIG. 1, the two working lines 4 and 5 are pressure-relieved towards a hydraulic medium tank 23. When control pressure is admitted to the first control line 18, the driving control valve 3 is moved into the working position on the left in FIG. 1, so that the hydraulic pump 2 delivers into the first working line 4. A working pressure is on the other hand admitted to the second working line 5 when a control pressure is admitted to the second control line 19 when the driving control valve 3 is in the working position 22 on the right in FIG. 1. The working pressure prevailing in the working line 4 or 5 is in this case preferably proportional to the control pressure produced by the pilot control device 11.

A regulating valve 24, which is formed as a 3/2-way valve in the embodiment, serves to actuate the adjusting device 7. A first pressure chamber 25 of the regulating valve 24 is connected via a shuttle valve 26 to the two control lines 18 and 19. The control pressure which is higher at the time therefore prevails in the first pressure chamber 25. A second pressure chamber 26, lying opposite the first pressure chamber 25, is connected via a respective non-return valve 27 and 28 to the second working line sections 4b and 5b. The higher working pressure in the two working lines 4 and 5 which is applied to the hydraulic motor 6 therefore prevails in the second pressure chamber 26 in each case. The position of the regulating valve 24 is therefore determined by the pressure difference between the higher control pressure prevailing in the two control lines and the higher working pressure prevailing in the two working lines 4 and 5 at the hydraulic motor 6. While a first adjusting chamber 29 is connected to the outlet of the regulating valve 24 and therefore admits an adjusting pressure which is dependent on the pressure difference between the working pressure and the adjusting pressure, a second adjusting chamber 30 of the adjusting device 7 is connected via the two non-return valves 27 and 28 to the two working lines 4 and 5. A first inlet of the regulating valve 24 is likewise connected via the two non-return valves 27 and 28 to the two working lines 4 and 5, while a second inlet is connected to the hydraulic medium tank 23.

The control pressure produced by the pilot control device 12 therefore has a dual function: Firstly, it determines via the driving control valve 3 the working pressure prevailing in the working lines 4 and 5 and acting on the hydraulic motor 6. Secondly, it acts via the shuttle valve 26 on the regulating valve 24 such that the first adjusting chamber 25 increasingly admits adjusting pressure as the control pressure increases, so that the hydraulic motor 6 is returned towards a reduced displacement volume. Both measures, i.e. the increase in the working pressure in the respective working line 4 and 5 and the reduction in the displacement volume of the hydraulic motor 6, result in an increase in the speed output by the hydraulic motor 6 and therefore an increase, for example, in the travelling speed of a vehicle or the rotational speed of a turning mechanism. In this case, however, measures must be taken to ensure that the speed of the hydraulic motor does not exceed a critical value and that there is no possibility of overreving of the hydraulic motor 6, which would cause damage. For this purpose, according to the invention, it is not only the control pressure which acts on the regulating valve 24, but also the respective working pressure, the regulating valve 24 venting the first adjusting chamber 29 of the adjusting device 7 to the hydraulic medium tank 23 as the working pressure increases. The hydraulic motor 6 is thereby returned to a greater displacement volume if there is an excessive working pressure in the working line which could cause overreving of the hydraulic motor 6.

The configuration according to the invention combines on the one hand the function of dual utilisation of the control pressure to adjust both the working pressure and the displacement volume of the hydraulic motor 6 with the additional function of preventing overreving of the hydraulic motor 6 by the working pressure acting on the regulating valve 24 in the opposite direction.

The pressure in the working lines 4 and 5 is maintained at a safe level by two pressure relief valves 31 and 32, which are disposed in series, have a non-return function and which relieve the working line carrying high pressure at the time towards the working line carrying low pressure at the time if the working pressure in the working line carrying high pressure exceeds a predetermined threshold value.

A brake valve 33 is also provided in the working lines 4 and 5. The purpose of the brake valve 33 is to produce a braking torque in overrun mode, for example when a hydrostatic travelling drive is moving downhill or a turning mechanism of an excavator standing on an inclined plane is swinging downhill.

In the embodiment the brake valve is formed as a 3/2-way valve. The brake valve 33 is closed in the neutral position 34. The brake valve 33 is actuated by the pressure difference in the first working line sections 4a and 5a connected to the driving control valve 3. If the pressure in one of these working line sections 4a and 5a increases, the brake valve 33 is moved into one of its two working positions, 35 or 36. While the hydraulic medium flows from the hydraulic pump 2 to the hydraulic motor 6 via one of the two non-return valves 8 and 9, the opposite non-return valve 8 or 9 is closed, and the return flow takes place via the brake valve 33 and one of the two non-return valves 37 and 38.

The brake valve 33 therefore only throttles the return flow to an insignificant degree in normal working mode. In overrun, however, the pressure in the first working line sections 4a and 5a is low or even zero, as the initiator 11 is not or no longer swung out in overrun mode. The hydraulic motor 6 works as a hydraulic pump in overrun mode and builds up a back pressure in one of the two second working line sections 4b and 5b. The back pressure results from the fact that the hydraulic medium can only run off in throttled fashion via the brake valve 33 in overrun, as the brake valve 33 is not deflected from its neutral position 34 in this operating state, or only to an insignificant degree. The back pressure building up supports the hydraulic motor 6, i.e. the speed of the hydraulic motor 6 is reduced by the back pressure.

The back pressure building up in the first working line sections 4a, 5a has a further function. The regulating valve 24 is acted upon via the non-return valves 28 and 27 on the basis of the control pressure apportioned in this operating mode such that the first adjusting pressure chamber 29 is vented towards the pressure medium tank 23 and the hydraulic motor 6 is adjusted to a high displacement volume. This increases the braking effect, as the hydraulic motor 6, acting as a pump, thereby builds up an even higher back pressure upstream of the brake valve 33.

Moreover, smooth, jolt-free deceleration is achieved when the initiator 11 returns to its neutral position.

Essential advantages of the configuration according to the invention consist on the one hand in a virtually jolt-free run-up to a large angle of rotation of the hydraulic motor 6 with a large torque and high efficiency. This prevents vibration problems, known from the prior art, when accelerating. The deceleration behaviour of the hydrostatic transmission 1 according to the invention is relatively smooth. The braking effect which is described prevents unnecessary heating of the oil. The solution according to the invention is relatively inexpensive.

Figure 2:
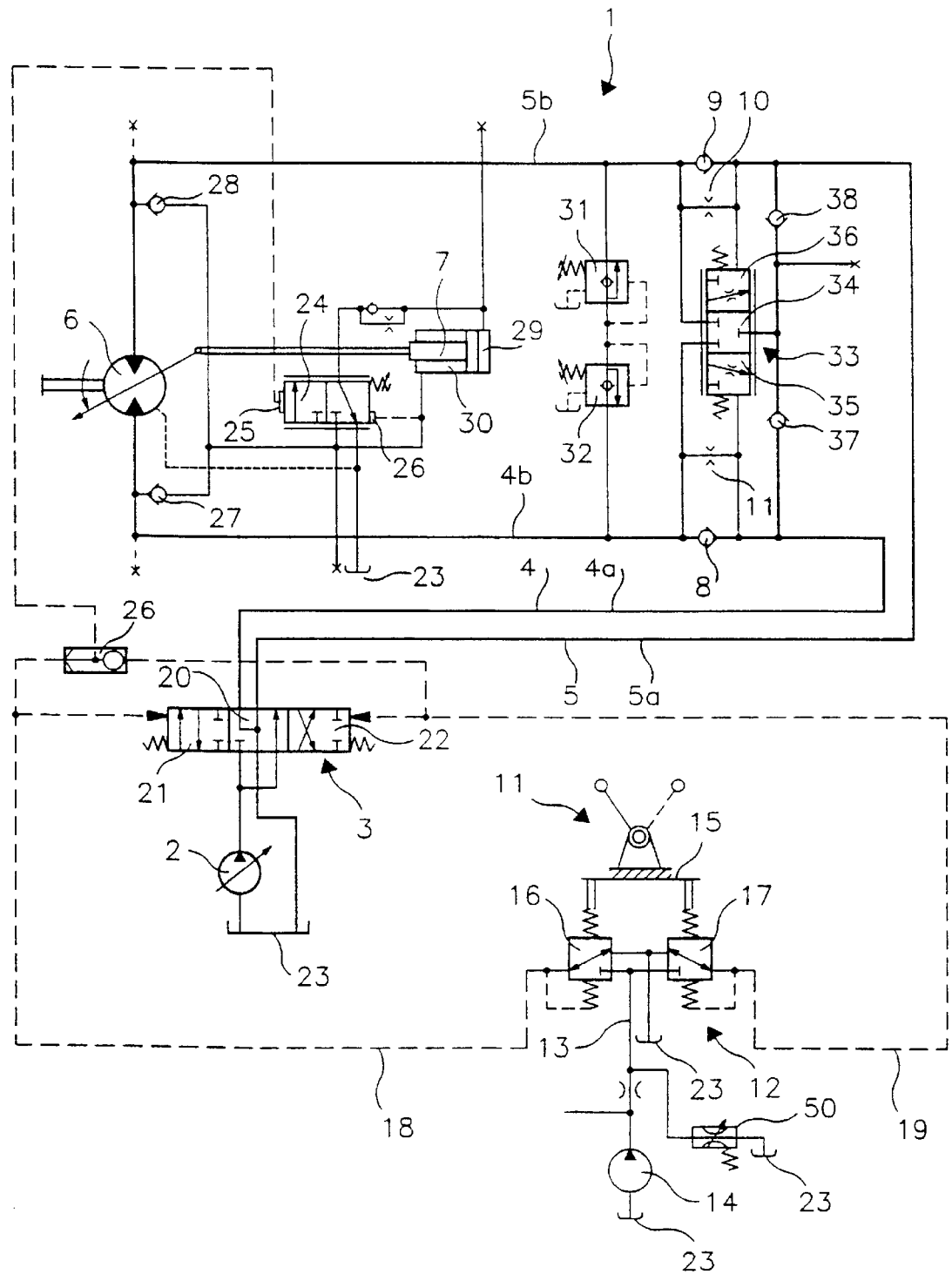
FIG. 2 is a second embodiment of a hydrostatic transmission according to the invention.

FIG. 2 shows a second embodiment of the hydrostatic transmission 1 according to the invention. Elements which have already been described are given corresponding reference characters, so that it is unnecessary to repeat the description.

The difference with respect to the embodiment already described in the light of FIG. 1 lies in the fact that an adjusting valve 50 in the form of an inching valve is disposed between the pressure source 14 and the pilot control device 12 on the one side and the hydraulic medium tank 23 on the other. The adjusting valve 50 enables the inlet pressure supplied to the pilot control device 12 to be adjusted and thus the control pressure to be overridden. A creep speed or emergency stop operation is as a result possible.

Figure 3:
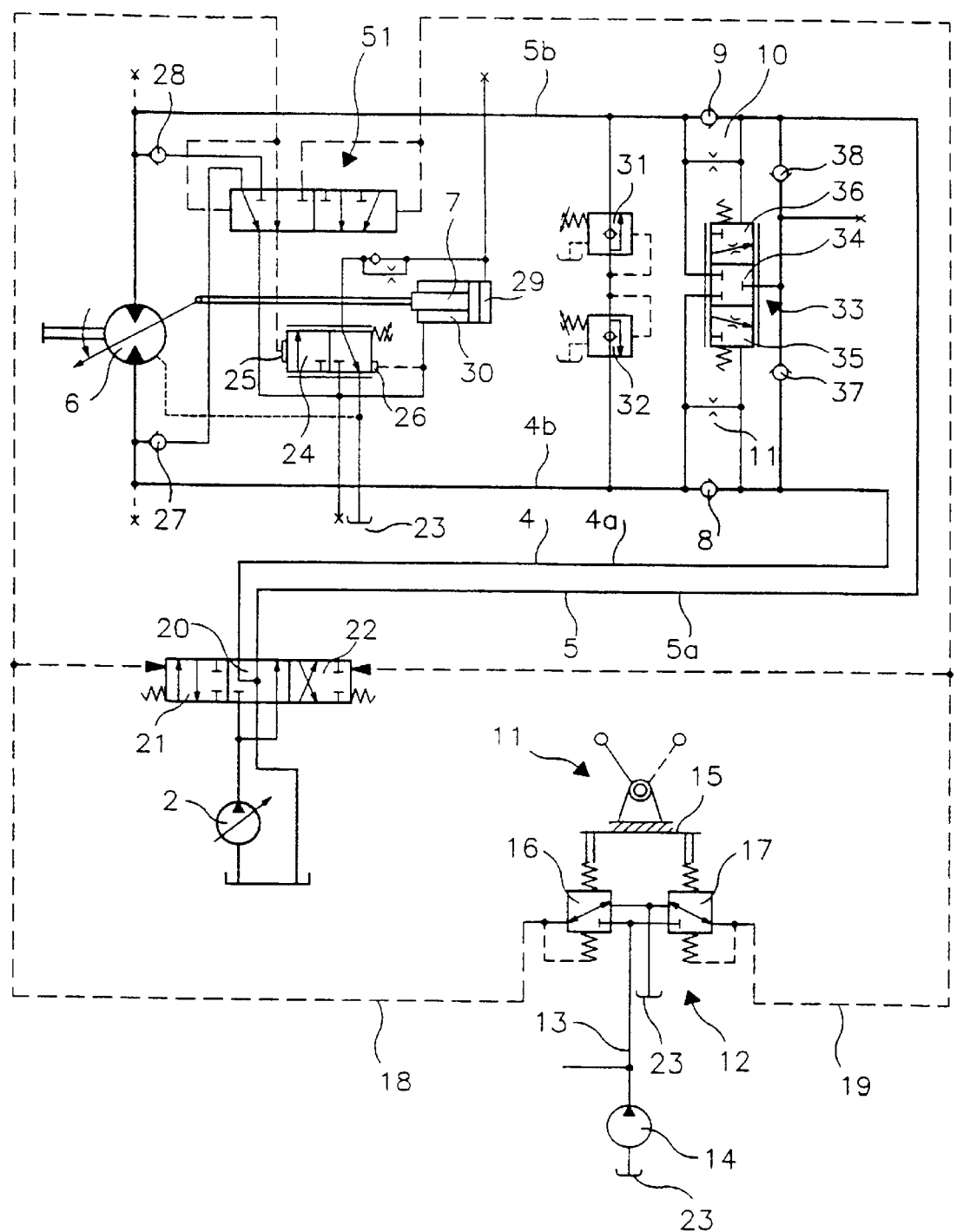
FIG. 3 is a third embodiment of a hydrostatic transmission according to the invention.

FIG. 3 shows a further embodiment of the hydrostatic transmission 1 according to the invention. Here too elements already described are given corresponding reference characters, so that the above description can be referred to with regard to these elements.

The embodiment represented in FIG. 3 differs from that already described in the light of FIG. 1 in that the shuttle valve 26 has been omitted and the two control lines 18 and 19 lead to a change-over valve 51 connected upstream of the regulating valve 24. The two first working line sections 4a and 5b likewise also lead via the non-return valves 27 and 28 to the change-over valve 51, which is likewise formed as a 6/2-way valve. The change-over valve 51 is actuated by the pressure difference between the two control pressures prevailing in the control lines 18 and 19 and, according to which of the two control lines 18 and 19 admits control pressure, connects the control line . . . or 19 carrying control pressure at the time to the first pressure chamber 25 of the regulating valve 24. The change-over device 51 at the same time connects the second working line section 4b or 5b carrying the high pressure at the time to the regulating valve 24 and the adjusting device 30, in particular to the second pressure chamber 26 of the regulating valve 24. The non-return valves 27 and 28 may optionally also be omitted in this configuration.

The two embodiments represented in FIGS. 2 and 3 may of course easily be combined, i.e. the adjusting valve so may also be fitted between the pressure source 14 and the hydraulic medium tank 23 in the embodiment of FIG. 3.

What is claimed is:

1. Hydrostatic transmission (1) with
   at least one hydraulic pump (2),
   at least one adjustable hydraulic motor (6), which is connected via working lines (4, 5) to the hydraulic pump (2)
   a driving control valve (3) disposed in the working lines (4, 5) to adjust the flow from the hydraulic pump (2) to the hydraulic motor (6),
   an adjusting device (7) for adjusting the displacement volume of the hydraulic motor (6) and
   a regulating valve (24) for regulating an adjusting pressure operating the adjusting device (7),
   characterized in
      that a pilot control device (12) is provided which produces a control pressure in accordance with a initiator (11),
      which pressure acts on the driving control valve (3) to adjust the delivery flowing from the hydraulic pump (2) to the hydraulic motor (6) and on the regulating valve (24) to adjust the displacement volume of the hydraulic motor (6),
      wherein the regulating valve (24) is actuated by the pressure difference between the working pressure prevailing in the working lines (4, 5) at the hydraulic motor (6) and the control pressure produced by the pilot control device (12).

2. Hydrostatic transmission according to claim 1, characterised in
   that two control lines (18, 19) are connected to the pilot control device (12), and a first control line (18) admits control pressure when the initiator (11) is operated in a first direction of travel and a second control line (19) admits control pressure when the initiator (11) is operated in a second direction of travel, and
   that the driving control valve (3) is actuated by the pressure difference between the two control lines (18, 19) in order to admit the working pressure produced by the hydraulic pump (2) to either a first or a second working line (4, 5) in accordance with the direction of travel.

3. Hydrostatic transmission according to claim 2, characterised in
   that a shuttle valve (26) or two non-return valves (28, 29) is/are disposed between the control lines (18, 19) and the regulating valve (24), so that the higher control pressure prevailing in the two control lines (18, 19) is in each case supplied to a first pressure chamber (25) of the regulating valve (24).

4. Hydrostatic transmission according to claim 1, characterised in
   that a shuttle valve or two non-return valves (28, 29) is/are disposed between the working lines (4, 5) and the regulating valve (24), so that the higher working pressure prevailing in the two working lines (4, 5) at the hydraulic motor (6) is in each case supplied to a second pressure chamber (26) of the regulating valve (24).

5. Hydrostatic transmission according to claim 2, characterised in that a change-over valve (51) is disposed between the control lines (18, 19) and the regulating valve (24) and between the working lines (4, 5) and the regulating valve (24), so that the higher control pressure prevailing in the two control lines (18, 19) is in each case supplied to a first pressure chamber (25) of the regulating valve (24) and that the higher working pressure prevailing in the two working lines (4, 5) at the hydraulic motor (6) is in each case supplied to a second pressure chamber (26) of the regulating valve (24).

6. Hydrostatic transmission according to claim 1, characterised in that the regulating valve (24) is a 3/2-way valve, which is connected on the inlet side to the working lines (4, 5) and a hydraulic medium tank (23) and on the outlet side to a first adjusting chamber (29) of the adjusting device (7).

7. Hydrostatic transmission according to claim 6, characterised in that a second adjusting chamber (30) of the adjusting device (7) is connected to the working lines (4, 5).

8. Hydrostatic transmission according to claim 1, characterised in that a brake valve (33) is provided which is actuated by the pressure difference in two first working line sections (4a, 5a) connected to the driving control valve (3), wherein the first working line sections (4a, 5a) are each connected via first non-return valves (8, 9) to second working line sections (4b, 5b), which are connected to the hydraulic motor (6).

9. Hydrostatic transmission according to claim 8, characterised in that the brake valve (33) is connected on the inlet side to each of the two second working line sections (4b, 5b) and on the outlet side to each of the two first working line sections (4a, 5a) via second non-return valves (37, 38).

10. Hydrostatic transmission according to claim 9, characterized in that the brake valve (33) is a 3/3-way valve which in a neutral position (34) separates the second working line sections (4b, 5b) from the first working line sections (4a, 5a) and in a first and second working position (35, 36) connects one of the two second working line sections (4b, 5b) to th,e non-pressure-carrying first working line section (4a, 5a) via one of the second non-return valves (37, 38).

11. Hydrostatic transmission according to claim 1, characterised in that the pilot control device (12) is connected to a pressure source (14), and an adjusting valve (50) is disposed between the pressure source (14) and a hydraulic medium tank (23).

* * * * *